US008965115B1

(12) United States Patent
Khosla et al.

(10) Patent No.: US 8,965,115 B1
(45) Date of Patent: *Feb. 24, 2015

(54) ADAPTIVE MULTI-MODAL DETECTION AND FUSION IN VIDEOS VIA CLASSIFICATION-BASED-LEARNING

(71) Applicant: HRL Laboratories, LLC, Malibu, CA (US)

(72) Inventors: Deepak Khosla, Camarillo, CA (US); Alexander L. Honda, Sunnyvale, CA (US); Yang Chen, Westlake Village, CA (US); Shinko Y. Cheng, Cupertino, CA (US); Kyungnam Kim, Oak Park, CA (US); Lei Zhang, Torrance, CA (US); Changsoo S. Jeong, Rancho Palos, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,886

(22) Filed: Dec. 9, 2013

Related U.S. Application Data

(60) Provisional application No. 61/785,035, filed on Mar. 14, 2013.

(51) Int. Cl.
*G06K 9/62* (2006.01)
*G06K 9/00* (2006.01)
(52) U.S. Cl.
CPC ........ *G06K 9/00577* (2013.01); *G06K 9/00369* (2013.01)
USPC ........... 382/159; 382/155; 382/156; 382/103; 382/224; 382/181

(58) Field of Classification Search
USPC .......................................... 382/155, 159, 161
See application file for complete search history.

(56) References Cited

U.S. PATENT DOCUMENTS

| | | | |
|---|---|---|---|
| 2012/0093407 A1* | 4/2012 | Mei et al. ...................... | 382/170 |
| 2013/0322742 A1* | 12/2013 | Walton et al. ................ | 382/159 |
| 2014/0064558 A1* | 3/2014 | Huang et al. ................. | 382/103 |
| 2014/0176752 A1* | 6/2014 | Jiang et al. ................ | 348/222.1 |
| 2014/0185925 A1* | 7/2014 | Datta et al. ................... | 382/159 |

OTHER PUBLICATIONS

Tzotsos and Argialas in "Support Vector Machine Classification for Object-Based Image Analysis", Lecture Notes in Geoinformation and Cartography, 2008, pp. 663-677.

(Continued)

*Primary Examiner* — Edward Park
(74) *Attorney, Agent, or Firm* — Tope-McKay & Associates

(57) ABSTRACT

Described is a system for object detection using classification-based learning. A fusion method is selected, then a video sequence is processed to generate detections for each frame, wherein a detection is a representation of an object candidate. The detections are fused to generate a set of fused detections for each frame. The classification module generates a classification score labeling each fused detection based on a predetermined classification threshold. Otherwise, a token indicating that the classification module has abstained from generating a classification score is generated. The scoring module produces a confidence score for each fused detection based on a set of learned parameters from the learning module and the set of fused detections. The set of fused detections are filtered by the accept-reject module based on one of the classification score or the confidence score. Finally, a set of final detections representing an object is output.

18 Claims, 7 Drawing Sheets

(56) References Cited

OTHER PUBLICATIONS

Takumi Kobayashi in "BFO Meets HOG: Feature Extraction Based on Histograms of Oriented p.d.f. Gradients for Image Classification" in Computer Vision and Pattern Recognition (CPVR), 2013 IEEE Conference, pp. 747-754.

Gonen and Alpaydin in "Multiple Kernel Learning Algorithms" in Journal of Machine Learning Research, 12, pp. 2211-2268, 2011.

\* cited by examiner

ADAPTIVE MULTI-MODAL DETECTION AND FUSION IN VIDEOS VIA CLASSIFICATION-BASED-LEARNING

GOVERNMENT LICENSE RIGHTS

This invention was made with government support under U.S. Government Contract Number HR0011-10-C-0033 Neovision2. The government has certain rights in the invention.

CROSS-REFERENCE TO RELATED APPLICATIONS

This is a Non-Provisional patent application of U.S. Provisional Application No. 61/785,035, filed in the United States on Mar. 14, 2013, entitled, "Adaptive Multi-Modal Detection and Fusion in Videos via Classification-Based-Learning."

BACKGROUND OF THE INVENTION (1) Field of Invention

The present invention relates to a system for object detection for video sequences and, more particularly, to a system for object detection for video sequences that is able to adapt to changing environments via an online learning scheme.

(2) Description of Related Art

Object detection is a computer technology related to computer vision and image processing that deals with detecting instances of semantic objects of a certain class (e.g., humans, cars) in digital images and videos. In order to detect a certain class of objects, a classifier first must be trained to recognize the class of objects using a set of training samples.

Online training gives a system the ability to adapt to a changing environment. Previous work in online learning requires streams of human labeled data in real time (or simulated real time), as described by Tzotsos and Argialas in "Support Vector Machine Classification for Object-Based Image Analysis", Lecture Notes in Geoinformation and Cartography, 2008, pp. 663-677, which is hereby incorporated by reference as though fully set forth herein. While it is preferable to use human labels for online training, in practice this is rare, if not impossible, to come by. It is labor intensive, and if running real-time, may be physically impossible.

Thus, a continuing need exists for an object detection system that is able to adapt to changing environments via an online learning scheme that uses a trained classifier to perform the task of labeling data, removing the dependency on human annotations.

SUMMARY OF THE INVENTION

The present invention relates to a system for object detection for video sequences and, more particularly, to a system for object detection for video sequences that is able to adapt to changing environments via an online learning scheme. The system comprises one or more processors and a memory having instructions such that when the instructions are executed, the one or more processors perform multiple operations. A fusion method is selected, and then an input video sequence is processed to generate a plurality of detections for each frame in the input video sequence, wherein a detection is a representation of an object candidate within the frame of the input video sequence. The plurality of detections is fused to generate a set of fused detections for each frame using the selected fusion method. The set of fused detections are sent to a classification module, a scoring module, and an accept-reject module. The classification module: a) generates a classification score for each fused detection, labeling the fused detection based on a predetermined classification threshold, and passes the classification score to a learning module and the accept-reject module; or b) generates a token indicating that the classification module has abstained from generating a classification score and passes the token to the learning module and the accept-reject module. The scoring module produces a confidence score for each fused detection based on a set of learned parameters from the learning module and the set of fused detections. The set of fused detections are then filtered by the accept-reject module based on one of the classification score or the confidence score. Finally, a set of final detections representing an object is output.

In another aspect, the system updates the set of learned parameters with the classification score and the confidence score when the classification score is available.

In another aspect, the system generates, by the learning module, a set of learned fusion parameters and a set of learned scored parameters, wherein the set of learned fusion parameters are provided as input to the fusion module, and wherein the set of learned scored parameters are provided as input to the scoring module.

In another aspect, if a classification score is available, then the accept-reject module automatically uses the classification score for filtering the set of fused detections and discards the confidence score, and wherein if the classification score is unavailable, then the accept-reject module uses the confidence score for filtering the set of fused detections.

In another aspect, the system uses a priority fusion method to fuse the plurality of detections, wherein priority is defined by the L2-norm of the feature vector $a_i$, weighted by at least one input parameter as follows:

$$z = \underset{i}{\mathrm{argmax}}\; w_i + \|a_i\|, \forall\, i = 1, \ldots, k,$$

where z is the index of the detection with the highest priority, argmax denotes argument of the maximum, w denotes at least one input parameter, k represents the total number of detection sources, i represents an index of the detection source (i=1, 2, ..., k), ‖ ‖ represents norm of, and ∀ denotes "for all".

In another aspect, the system uses a mean fusion method to fuse the plurality of detections.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
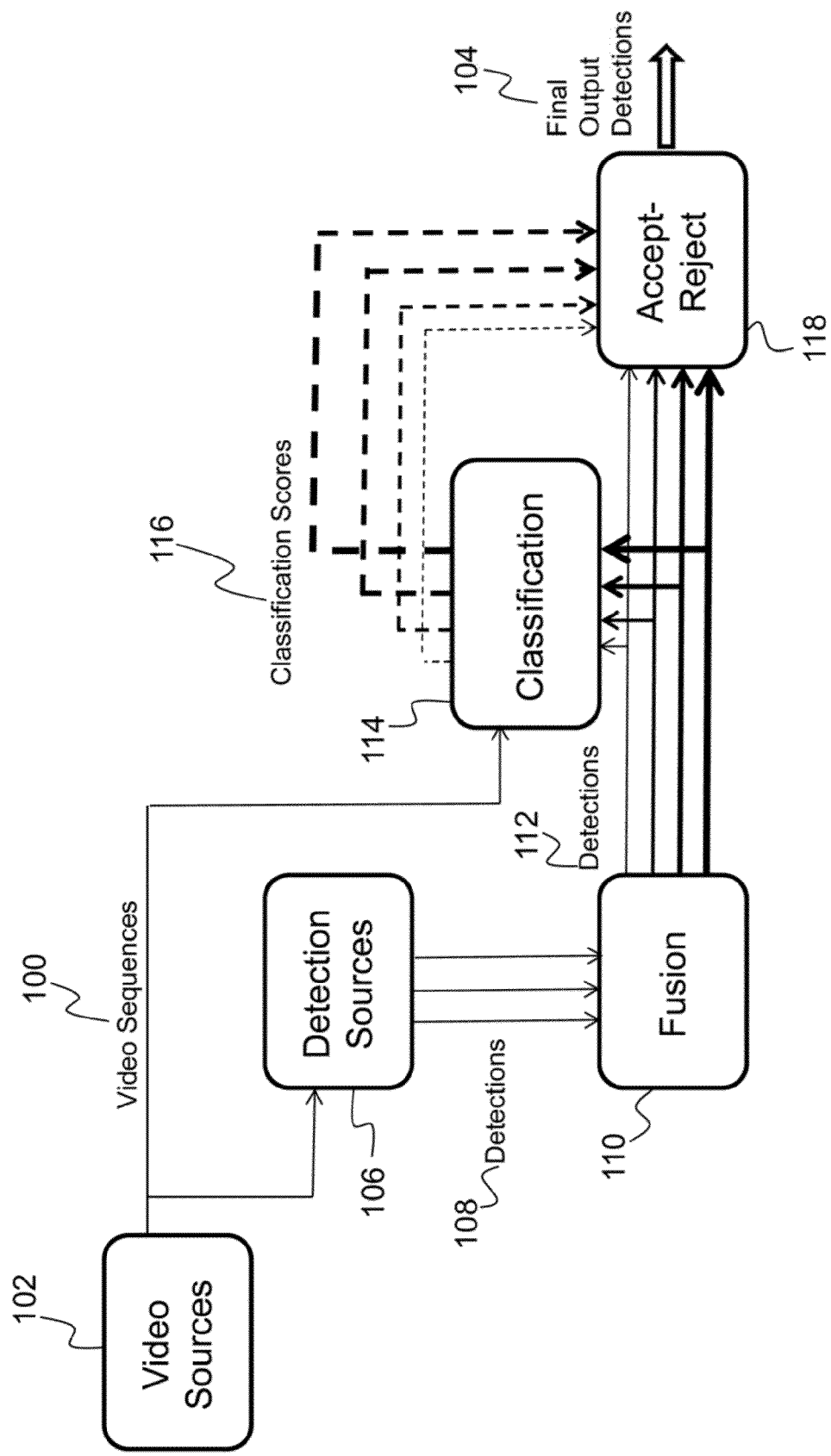
FIG. 1 is a base system diagram illustrating a system for object detection according to the principles of the present invention.

The present invention relates to a system for object detection for video sequences and, more particularly, to a system for object detection for video sequences that is able to adapt to changing environments via an online learning scheme. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a description of various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is a system for object detection for video sequences using classification-based learning. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for object detection for video sequences using classification-based learning. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Introduction

The system described herein provides a fast detection combination system for videos. Given detections with high false positives, true positives are filtered from false positives. Furthermore, detections can originate from multiple detection sources, which may produce nearly identical detections. Processing reoccurring detections would result in unnecessary false positives. To counter this, the system according to the principles of the present invention detects co-occurring detections and fuses them with multiple strategies. Additionally, the system filters, from the resulting fused detection, the true positives from the false positives.

In the present invention, it is assumed that the classifier is unable to process the full output of a fusion step. The classifier is given the ability to abstain from producing a score. In this way it can select to process a subset of detections at each image frame. This allows the system to run at a faster rate, but then requires another mechanism for sorting through the detections passed by the fusion step. This is achieved via a scoring and thresholding step, which learns parameters based on detections which the classifier is able to process.

Some specific terminology will be used to describe this system. These terms are used to describe the concepts that they represent to reduce any ambiguity that may result if the terms are used without such specific definitions.

A "true object" is a collection of pixels within a single frame of a video sequence that represents an object of a predetermined class set. Such a class set may contain, without implying a limitation, entries such as "Person", "Cyclist", "Bus", "Car", or "Truck". This differs from other types of objects which the user may desire the system to ignore. Such categories may be, without implying a limitation, "Plant", "Animal", "Road Sign", "Lamppost", or "Bench".

An "object candidate" is a region in a single frame of an image sequence which may roughly bound a true object. When passed to the classifier module, it is considered a "true positive" if the classifier indicates that it is indeed a true object and it is considered a "false positive" if the classifier does not. It is expected that because the present invention requires a near perfect classifier, the true positives will highly correlate with true objects, and false positives will correspond to improperly sized, misplaced, or partial detections.

A "detection" is a representation of an object candidate within a single frame of a video sequence which contains geometric properties that describe the associated frame, geometric properties, such as size, shape, location, and orientation, and additional feature properties that loosely describe identifying characteristics of the object candidate. Given the original video sequence, frame information, and the detection geometry, the object candidate should be able to be fully described (i.e., an image window can be extracted which fully contains the object candidate). An "output detection" is a special subcase of detection, which contains all the frame and geometric properties listed above, but only a single scalar feature property referred to as the "detection score".

Several components are required as meta-parameters to the system. These meta-parameters are not runtime input, but functions which describe the behavior of the system.

A "classifier" is a function which compares extracted images to an internal model. It returns a scalar quantity which represents the model's measure of similarity to any true object class. With this definition, one can interchange two-class classifiers with multiclass classifiers. As a non-limiting example, assume that higher values indicate greater similarity to true objects. One of the key assumptions of this invention is that the classifier is highly reliable.

A "detection source" is a function which takes as input a video sequence and produces as output a set of detections for each frame in the sequence. Intuitively, the set of all detection sources will be responsible for generating detections which attempt to represent all true objects in the video sequence, without adding extraneous detections. It is expected that a single detection source will not provide detections for all true objects (true positives) and will provide a non-trivial amount of detections which do not represent a true object (false positives).

A "fusion method" is a function which takes two or more detections from the same frame as input and produces as output a single output detection. The resulting output detection will be associated with the same frame, and should have similar geometric properties. The detection score is calculated as a function of the input detections' feature properties. Intuitively, the detection score encodes the strength of the detection.

(3) Specific Details (3.1) System Description

System behavior according to the principles of the present invention is defined by the following three components. Fusion methods provide modified detection sets when given detection sets; detection algorithms provide detection geometry and detection features, given input video sequences; and a classifier provides a score given a detection and a corresponding video sequence.

FIG. 1 is a base system diagram for object detection. The system accepts as input video sequences 100 from a video source 102 and produces final output detections 104. The input video sequence 100 is passed to detection algorithms in a detection sources module 106. The detection algorithms produce multiple sets of detections 108, which are then fused in a fusion module 110 (if necessary) by static fusion methods, possibly resulting in fused detections 112. If there is a single detection source or a single detection is produced, fusion is not necessary. The fused detections 112 are then passed to a classification module 114, which produces a classification score 116, and an accept-reject module 118. Based on the classification results, the accept-reject module 118 will filter out the false positives. Each of these modules is described in further detail below.

The classification module 114 is a function which takes as input a classifier, fused detections 112 and the corresponding input sequence (i.e., video sequence 100), and produces as output a scalar classification score 116. The classifier compares extracted images to an internal model. It returns a scalar quantity which represents the model's measure of similarity to any true object class. The different weights of the lines (e.g., varying levels of thickness) representing the fused detections 112 from the fusion module 110 to the classification module 114, as well as the classification scores 116 from the classification module 114 to the accept-rejection module 118 represent information associated with different fusion methods, where each line represents a distinct fusion method.

The classification module 114 uses a classifier, as described in the set of defined terms in the introduction above. The classification module 114 takes the image window corresponding to the "detection" from the input video/image sequence 100 and applies the classifier to this image window. It outputs a scalar quantity score (i.e., classification score 116) for each object class. As a non-limiting example, a classifier that could be used in the present invention is a Histogram of Oriented Gradients (HoG)/Bag of Features (BoF) multi-kernel learning (MKL) classifier. HoG/BoF is described by Takumi Kobayashi in "BFO Meets HOG: Feature Extraction Based on Histograms of Oriented p.d.f. Gradients for Image Classification" in Computer Vision and Pattern Recognition (CVPR), 2013 IEEE Conference, pgs. 747-754, which is hereby incorporated by reference as though fully set forth herein. The MKL classifier is described by Gonen and Alpaydin in "Multiple Kernel Learning Algorithms" in Journal of Machine Learning Research, 12, pgs. 2211-2268, 2011, which is hereby incorporated by reference as though fully set forth herein.

For example, if an input video sequence 100 has a car, and the detection sources module 106 detects the boundary of the car as a rectangular window, the classification module 114 will take this image window and apply the classifier to generate a classification score 116 for each class in the set (e.g., car 0.9, bicycle 0.05, person 0.05).

Associated with the classification module 114 is the classification threshold, which can be used for labeling. As a non-limiting example, detections with scores less than the classification threshold are labeled "non-objects", while detections with scores greater than or equal to the classification threshold are labeled "objects". Labels may also include a specific class, such as person or vehicle. The classification module 114 also has the feature to abstain from providing a classification score 116. This may be due to processing time constraints, detection size constraints, or inconclusive classification results. In this case, a special token is generated which indicates that the classifier has chosen to abstain so that if the classifier abstains, the entire system is aware of it. A non-limiting example of a special token is a label that indicates the system was unable to classify the object (e.g., UNKNOWN).

Figure 2:
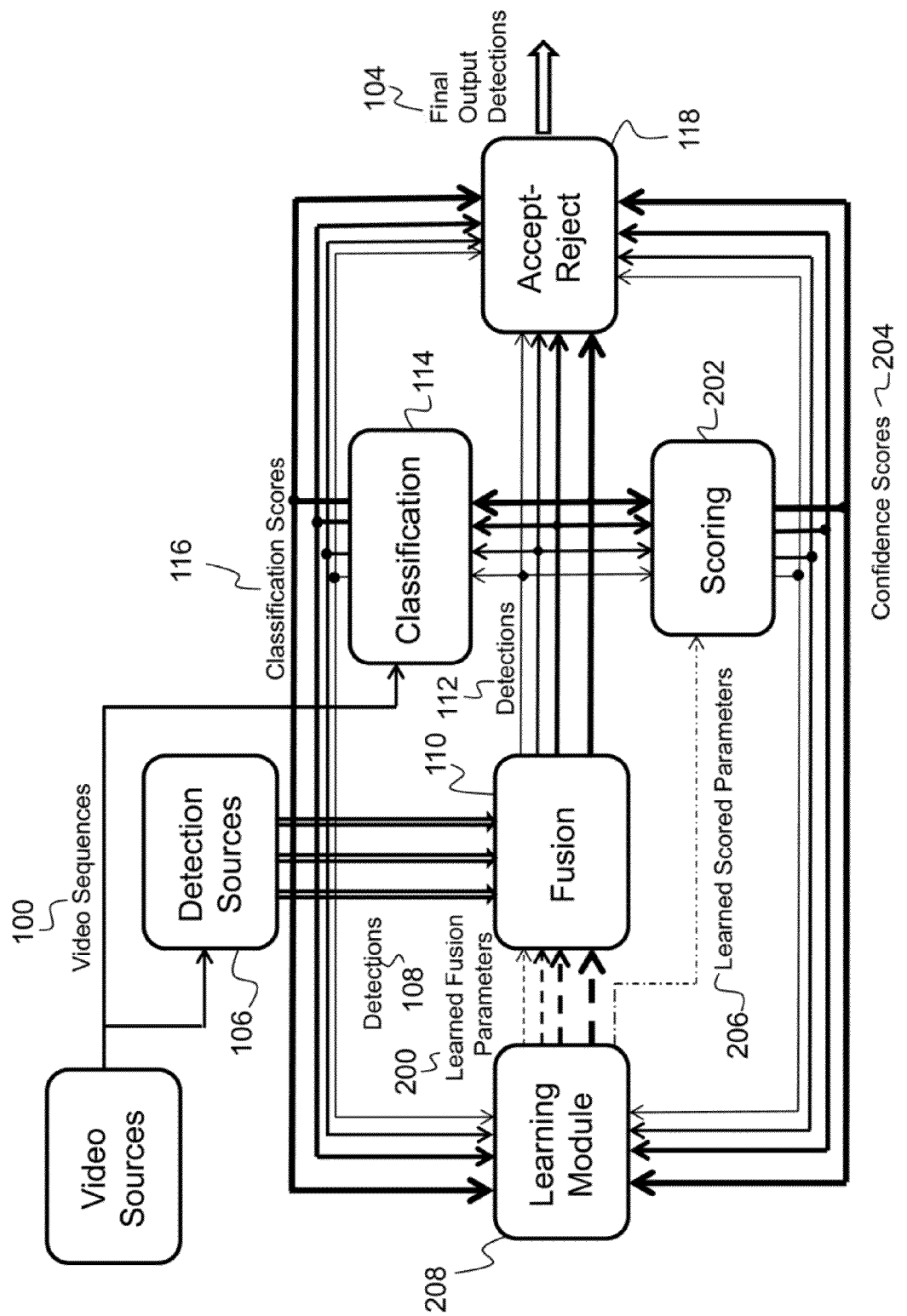
FIG. 2 is an adaptive system diagram illustrating a system for object detection via classification-based-learning according to the principles of the present invention.

FIG. 2 illustrates a flow diagram of an adaptive system according to principles of the present invention. Similar to the base system illustrated in FIG. 1, video input (i.e., video sequences 100) is passed to the detection algorithms of the detection sources module 106. The detection algorithms produce multiple sets of detections, which are then fused in the fusion module 110 by tunable fusion methods using learned fusion parameters 200. The fused detections 112 are then passed to a scoring module 202, the classification module 114, and the accept-reject module 118. Based on the classification results (classification scores 116), when available, and the scoring heuristic (confidence scores 204) (which uses learned parameters), the accept-reject module 118 will pass through some detections and block others. The classification scores 116 and scoring results (i.e., confidence scores 204) are then used to update the learned parameters (i.e., learned fusion parameters 200 and learned scored parameters 206) in the learning module 208. As with FIG. 1, the different weights of the lines (e.g., varying levels of thickness) represent information associated with different fusion methods, where each line represents a distinct fusion method.

The scoring module 202 is a function which takes the set of learned parameters (i.e., learned scored parameters 206) and the set of detections 112 and produces a scalar confidence score 204 which, in general, cannot be computed from single detection alone. The scoring module 202 produces a confidence score 204 for each detection (coming from the fusion module 110) based on the feature vectors, geometry vectors, and learned scored parameters 206 (obtained from the learning module 208). As a non-limiting example, the learned scored parameters 206 could be weights associated with the feature vector and geometry vectors. The scoring module 202 compares these vectors for detections based on the weights, and uses that comparison to produce a confidence score 204. For example, if two detections correspond to the same object (e.g., car), then their geometry vectors may be very similar. However, their feature vectors could be different. The learned scored parameters 206 may have a high weight for geometry similarity and a low weight for feature vector similarity. In this case, the scoring module 202 will give a high confidence for one of the boxes (i.e., above decision threshold) and a low confidence for the other (i.e., below decision threshold) so that only one of the detections will be passed through or produced.

Associated with the scoring module 202 is the confidence threshold, which ranks related detections 112. Intuitively, the scoring module 202 attempts to rank all detections 112 representing the same object and ensure that at most one of those detections has a corresponding confidence score 204 greater than a decision threshold. The decision threshold is an ad-hoc predefined threshold. As a non-limiting example, the decision threshold is typically chosen as approximately 0.8 and ranges from 0-1. This allows the fusion module 110 to produce multiple hypotheses per object, while the system as a whole accepts no more than one of them.

As described above, the fusion module 110 is a function which takes a set of fusion methods, the set of learned fusion parameters 200, and complete sets of detections 108 for a single frame from multiple detection sources 106 as input, and produces as output a potentially larger set of output detections 112 for the same frame. Non-limiting examples of detection sources include a motion detection source (e.g., detects moving car) and a stationary form detection source (e.g., detects stationary rectangular objects). The fusion module 110 finds co-located detections and runs all of the fusion methods on them. It passes uniquely located detections through, with the geometry and frame properties un-modified.

The learning module 208 is a deterministic finite state automaton (DFSA) which takes classification scores 116 and confidence scores 204 as input, and produces as output a set of learned parameters 200 and 206. Learned fusion parameters 200 are obtained from the learning module. For example, if there are two fusion methods based on motion detection source (e.g., detects moving car) and stationary form detection source (e.g., detects stationary rectangular objects), then the learned parameters could be their weights. For co-located detections, all fusion methods from the fusion module 110 are used. The input scores are associated with previous learned parameters and are used to update future learned parameters. The learned parameters are used as input to the fusions methods of the fusion module 110 (i.e., learned fusion parameters 200) and to the scoring module 202 (i.e., learned scored parameters 206). The DFSA (learning module 208) will self-transition if the classifier has abstained.

The accept-reject module 118 is a function which takes as input multiple detections 112 and corresponding classification scores 116 and confidence scores 204, and produces as output a reduced set of output detections (i.e., final output detections 104). This function uses the scores with the classifier and confidence thresholds to make two binary decisions about a particular detection. When the classification score 116 is unavailable, the function automatically accepts the confidence decision. When the classification score 116 is available, the accept-reject module 118 will automatically accept the classification decision (i.e., classification score 116) and discard the confidence decision (i.e., confidence score 204). The accept-reject module 118 is also responsible for converting the features' properties and scores of a detection into a final detection score. The features are passed from the multiple detection sources 106 to the fusion module 110. Each detection 108 includes a feature vector. The same feature vector is utilized by the accept-rejection module 118.

(3.2) System Flow

The following is a description of the system flow of the present invention referring to FIG. 2. First, the system is initialized. The image frame number in the video sequence 100 is initialized, and the learning module's 208 internal state is set to some reasonable default. Then the system iterates frame-by-frame.

Detections 108 for a given frame are passed to the fusion module 110. The fusion module 110 detects co-located object detections and applies at least one fusion method, described in detail below, to each unique object candidate (many detections may be associated with a single object candidate). Thus, if the number of fusion methods is greater than the number of co-located detections, the number of detections in the system temporarily increases. When a detection is not co-located with any others, it is passed through a unary fusion method which may modify the feature properties, but should not change the geometry or frame properties. This function ensures similar types of detection feature properties are created for both co-located and uniquely located detections.

The resulting detections 112 are passed to the classification module 114 and the scoring module 202. The scoring module 202 produces a confidence score 204 for each detection based on the feature vectors, geometry vectors, and learned scored parameters 206. This confidence score 204 is passed to the accept-reject module 118 and the learning module 208. The classification module 114 may either produce a classification score 116 or a special token indicating that it abstained for each detection. In the case that a classification score 116 is produced, the system passes this score to the learning module 208 and the accept-reject module 118. In the case that the classification module 114 abstains, the system passes a special token to the accept-reject module 118 and the learning module 208.

The learning module 208 will self-transition when it receives notice that the classifier has abstained; it will not attempt to modify its state when no classification information is available. It will otherwise perform an update step based on the classification scores 116, confidence scores 204, and the associated learned parameters from the previous step that created the detections. This produces a new set of parameters for the fusion module 110 and for the scoring module 202. The learning module 208 is coupled with the fusion methods of the fusion module 110 because it must choose appropriate updates for the learned fusion parameters 200. If the detections are processed temporally in clusters associated with candidate objects, then these new parameters may be updated and used as soon as all detections associated with a single candidate object have been processed. An update step does not imply learning related computation occurs at each step. An update step may involve storing information for each detection, until at the last detection of the frame the system runs an update step on all stored data.

The accept-reject module 118 will use the classification threshold and the classification score 116 to either accept or reject each associated detection. Accepted detections also have the same frame and geometric properties, but will have the feature properties replaced by a final scalar detection score. The final scalar detection score is the final output from the accept-rejection module 118 (i.e., final output detections 104). Rejected detections are discarded, and not passed as output to the system. When the accept-reject module 118 recognizes that the classification has abstained, it uses the confidence threshold to choose whether to accept or reject the detection.

(3.3) Fusion Methods

For simplicity in the following non-limiting example fusion methods, assume that detections, $d_i$ are represented as axis aligned rectangles, denoted by the position of their top, right, bottom, and left boundaries, $t_i=(d_i)_1$, $l_i=(d_i)_2$, $b_i=(d_i)_3$, and $r_i=(d_i)_4$ respectively. Similar fusion methods exist for other representations. Furthermore, assume that all detection methods generate feature vectors, $a_i$ via similar methods, such that the feature vectors from each detection source will have the same dimension, and each corresponding element in the vectors will roughly represent the same physical properties. This assumption can be circumvented by defining a translation function for each detection source which processes the original feature vectors into the format above.

The types of fusion methods can be split into two categories: static fusion and dynamic fusion. Static fusion methods are fixed and do not update behavior based on input parameters. Dynamic fusion methods accept input parameters, which can alter the geometry properties or the feature properties of the output detection. These are useful for learning, however not essential, as learning parameters are also used in the scoring module. In principal, with all static fusion methods it is still possible to learn new behavior based off processing of the feature property vectors in the scoring module alone.

(3.3.1) Union/Intersection Fusion

Given that detections d, for i=1 . . . k overlap, a fused detection, $d_f$, is generated by taking the outermost boundary of all conflicting detections. Assume in the following that boundary location is represented using the standard convention where the upper leftmost corner of the screen is (0,0), and coordinates increase towards the right and bottom edges as follows:

$$t_f=\min t_i;\ l_f=\min l_i;\ b_f=\max b_i;\ r_f=\max r_i.$$

Since the "largest" decision is considered for each boundary, it is logical to accept the largest score:

$$(a_f)_j=\max_i(a_i)_j.$$

It is straightforward to design intersection fusion from the definition of union fusion from above, as would be obvious to one skilled in the art of basic set theory. Both of these methods are static fusion methods because they do not take any parameters, such as weights, as input in order to change the behavior of the fusion.

In the following two example fusion methods, it is assumed that weights $w_i$ for i=1 . . . N are given as input parameters, where N is the number of detection sources. In this case, a very simple set of learned parameters is used. Weights loosely represent a prior confidence in each detection source. The weights in these examples are associated with a particular detection source. Since $d_i$ for i=1 . . . k in general does not contain detections from all sources, assume that $d_i$ has been associated with the weight $w_i$ from the corresponding detection source. Furthermore, denote $$W = \sum_1^k w_i$$

for convenience.

(3.3.2) Mean Fusion

Given that detections $d_i$ for i=1 . . . k overlap, a fused detection, $d_f$, is generated by taking the mean position of each boundary (top (t), left (l), bottom (b), right (r)):

$$t_f = \frac{1}{kW}\sum_1^k w_i t_i;$$

$$l_f = \frac{1}{kW}\sum_1^k w_i l_i;$$

$$b_f = \frac{1}{kW}\sum_1^k w_i b_i;$$

$$r_f = \frac{1}{kW}\sum_1^k w_i r_i.$$

Then, fuse the feature scores by independently averaging each feature as follows:

$$(a_f)_j = \frac{1}{kW}\sum_{i=1}^k w_i (a_i)_j,$$

where $a_i$ is a feature vector corresponding to the ith detection, j is the length of the feature vector, and k is the number of detections. Mean fusion operates well when detections tend to be correct but with some additive noise with zero mean error.

(3.3.3) Priority Fusion

Given that detections $d_i$ for i=1 . . . k overlap, a fused detection, $d_f$, is generated by returning the detection with the highest priority. Priority is defined by the L2-norm of the feature vector $a_i$, weighted by at least one input parameter as follows:

$$z = \underset{i}{\mathrm{argmax}}\, w_i + \|a_i\|, \forall\, i = 1, \ldots, k,$$

where z is the index of the detection with the highest priority, argmax denotes argument of the maximum, w denotes at least one input parameter, k represents the total number of detection sources, i represents an index of the detection source (i=1, 2, ..., k), ‖ represents norm of, and ∀ denotes "for all". The fused detection is then trivial as follows:

$$d_f = d_z;\ a_f = a_z.$$

Priority fusion operates well when there is a clear indicator of performance. Detections that perform well will be favored over poor detections. In practice, the feature vector will be bounded. This allows the system to set weights high enough to order sources by reliability, essentially putting a priority on the detection source instead of the detection. Priority fusion is based on performance results analyzed after the system is executed or experience of the user. For example, if a scene contains a large number of small moving objects versus a scene that contains one large object, the fusion methods will be somewhat different.

(3.4) Learning

The learning module 208 can be implemented in a multitude of ways. Using the classification threshold to generate binary labels and a combination of confidence scores and previous states, AdaBoost, a machine learning algorithm, can be used. In the present invention, the GML (Graphics Media Lab) AdaBoost Matlab Toolbox was used. However, as can be appreciated by one skilled in the art, any suitable machine learning algorithm could be used. Boosting methods are appropriate for this problem, because there are several hypothesis functions in addition to the scoring module. This essentially gives weak classifiers, which boosting excels at enhancing.

Another approach is to formulate the problem as an objective function and use derivative free optimization techniques for calculating updates. Gradient based methods do not apply in most cases because of the complexity of the fusion and subsequent scoring steps. Methods such as simulated annealing use estimations of the local state to effectively find the optimum with limited knowledge of the space. For instance, in the present invention, adaptive simulated annealing (ASA) for optimizing nonlinear stochastic systems was used, which can be found on Google Project Housing. Furthermore, these methods are iterative, when lends themselves to the frame by frame nature of this problem. It is expected that learned parameters may have to drastically change over the length of a long video sequences, but only continuous or small step transitions will occur on a frame to frame basis. Given a good starting point local methods are able to track local optima well.

(3.5) Experimental Studies

Figure 3:
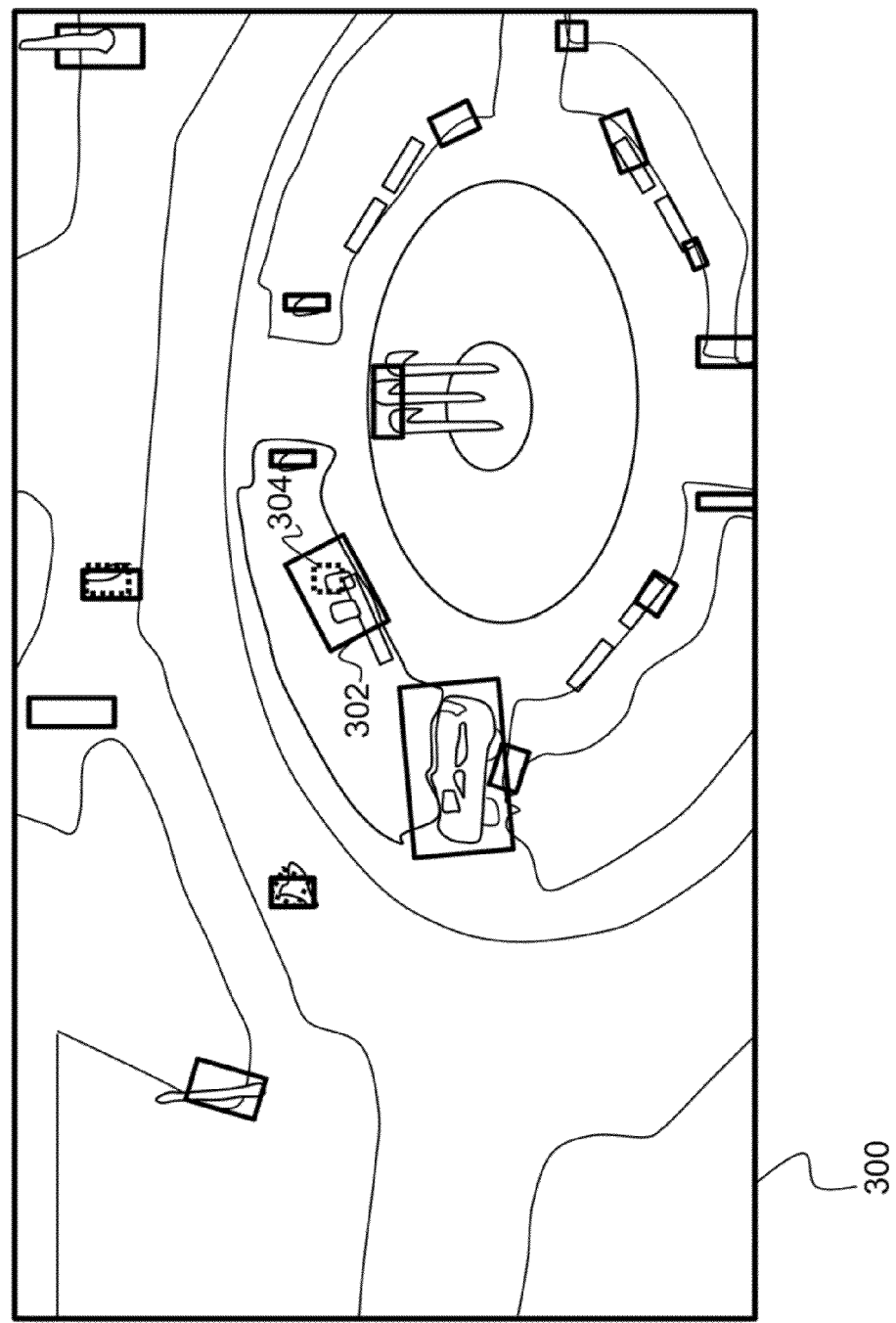
FIG. 3 illustrates a result of object detection in an image by two object detection methods according to the principles of the present invention.

In experimental studies, multiple detection sources frequently re-detected the same object candidate. FIG. 3 is an illustration of an image 300 that shows the necessity of fusion to remove duplication. Two detection methods were run on a video sequence, and detections were extracted. The first method was a saliency based algorithm for detecting "stationary" form, independent of motion. Detections based on the first method are represented by solid line boxes 302 in FIG. 3. The second method was a motion based method for detecting "moving" objects. Detections based on the second method are represented by dashed line boxes 304 in FIG. 3. Ideally, these should produce complementary detections, because "stationary" and "moving" should be mutually exclusive. However, experimental studies demonstrated multiple co-detections of targets, an example of which is illustrated in FIG. 3. Intuitively, as more detection methods are added, the number of conflicts will increase. To reduce these co-located boxes, fusion must be performed, as described above.

With as few as two detection methods re-detection was a common result as indicated in FIG. 3. It was found that different scenes required different fusion methods, which had to be chosen manually. Once a fusion type was chosen, it worked well for similar scenes. This lead to the conclusion that multiple fusion methods could be explored and the "best" could be learned. It was also verified that fusing detections provided a benefit by measuring the true positive percentage to the false alarms per frame before and after fusion, for select fusion methods. In a desired aspect, the fusion method is selected prior to initiation of video processing. If selection were to occur in the middle of video processing, the video would need to be divided into sections based on the observed scene type and stop after each section to change fusion methods.

Figure 4:
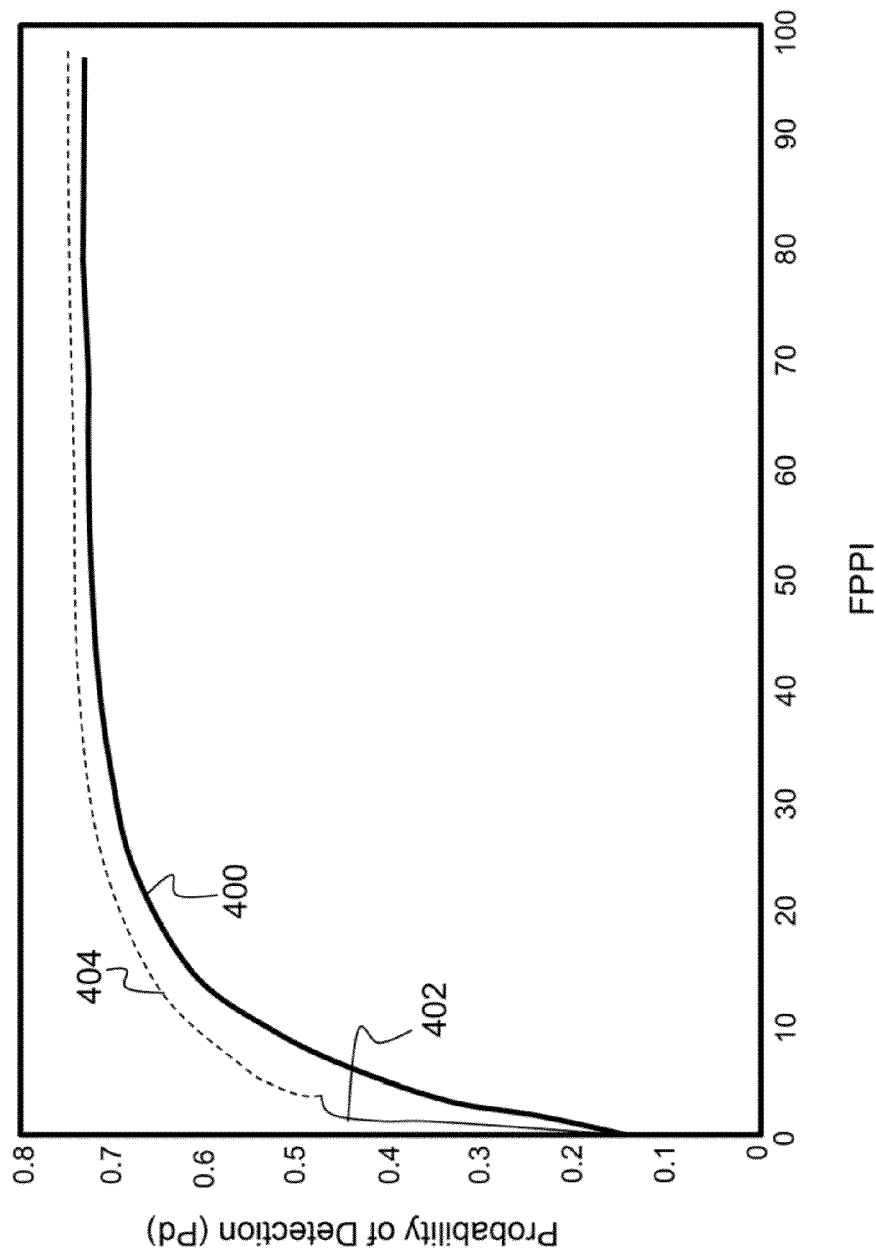
FIG. 4 is a receiver operating characteristic (ROC) plot illustrating advantages of fusion of object detection methods over selecting a single object detection method according to the principles of the present invention.

FIG. 4 illustrates a receiver operating characteristic (ROC) plot demonstrating the advantages of fusion over selecting any single method. Along the x-axis is false positive per image (FPPI), and along the y-axis is probability of detection. The fusion method used in FIG. 4 was priority by detection score. With this method, if two co-located detections occur, the fusion method picks the detection with the higher score. All detections generated by the first method (saliency based algorithm), represented by the bold solid curve 400, were assigned lower priority, and any detections generated by the second method (motion based method), represented by the solid curve 402, were assigned higher priority. The resulting fused curve, represented by the dashed curve 404, has better detection capability than either of the original methods. The second method (motion based method) has higher priority; therefore, the early part of the fused curve (dashed curve 404) is identical to the second method (solid curve 402), since fusion picks the second method detections only as they are a higher priority. Furthermore, the fused method had higher false alarm rates than either of the methods. Proper selection of fusion methods is key for improved results. The present invention learns the best method in an online fashion.

Figure 5:
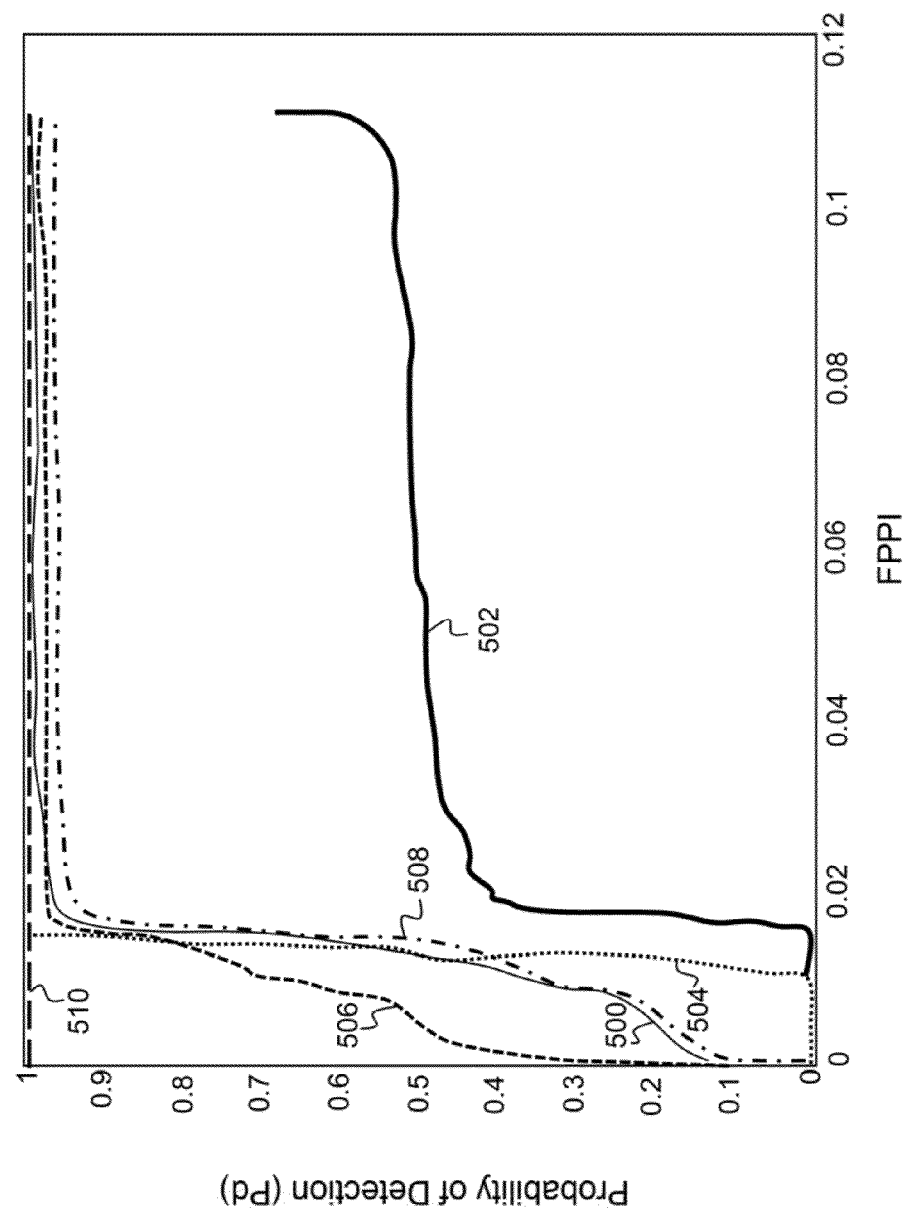
FIG. 5 is a plot illustrating the performance of the multi-class classification system according to the principles of the present invention.

A high precision classifier is required for the present invention. The desired results were obtained from a Histogram of Oriented Gradients (HoG)/Bag of Features (BoF) multi-kernel learning (MKL) classifier. The results are shown in FIG. 5, which is a ROC plot demonstrating the performance of the multi-class classification system of the present invention. The system is able to almost perfectly distinguish target classes, which include all object recognition (curve 500), bus recognition (curve 502), car recognition (curve 504), cyclist recognition (curve 506), person recognition (curve 508), and truck recognition (curve 510).

Figure 6:
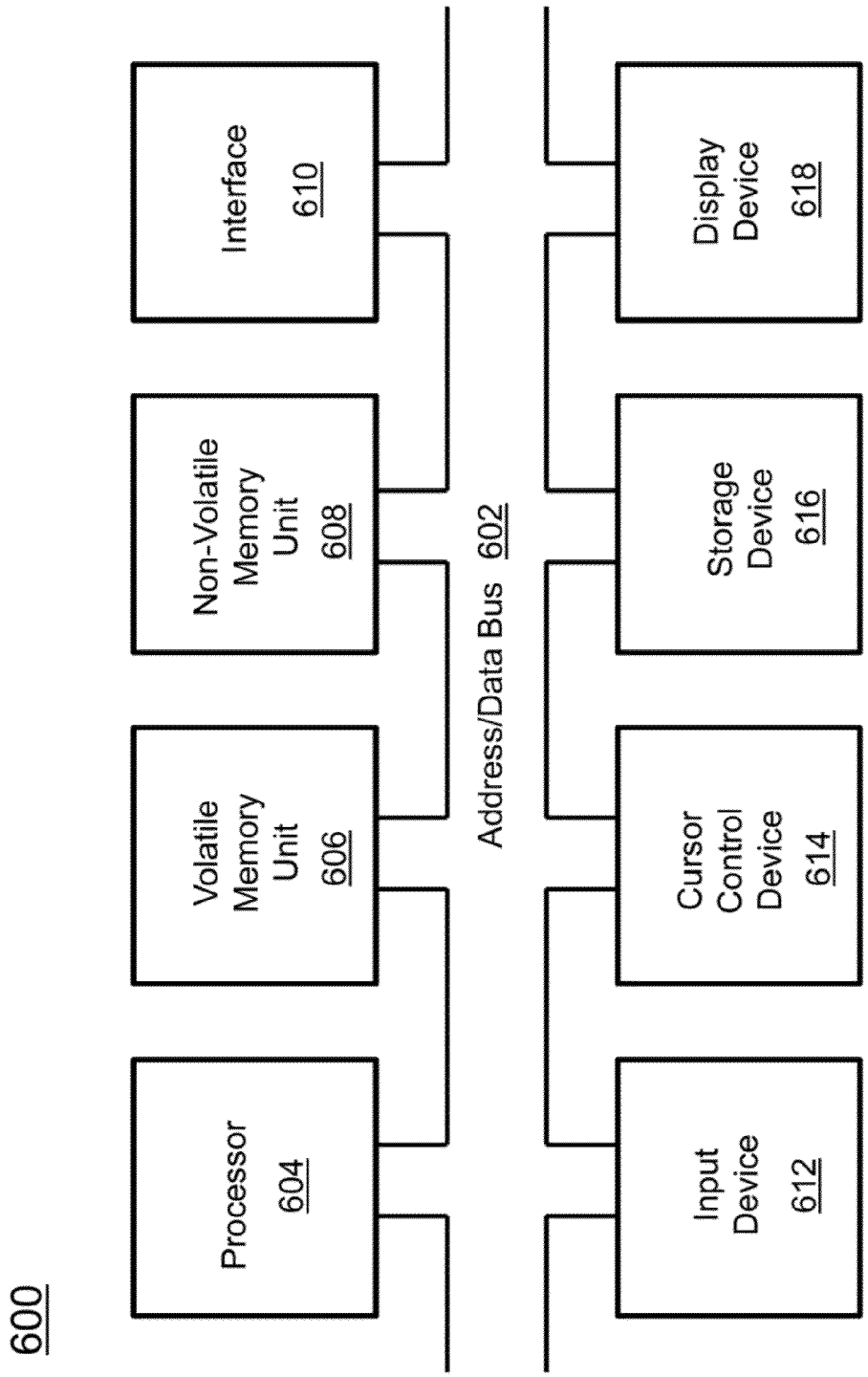
FIG. 6 is an illustration of a data processing system according to the principles of the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM "EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In an embodiment, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric and/or function keys. Alternatively, the input device 612 may be an input device other than an alphanumeric input device. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 7:
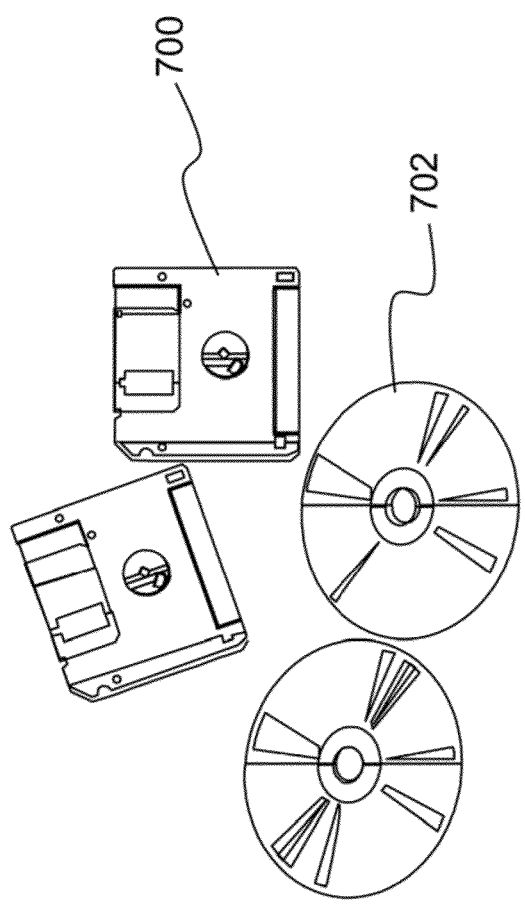
FIG. 7 is an illustration of a computer program product according to the principles of the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for object detection for video sequences using classification-based learning, the system comprising:
   one or more processors and a non-transitory memory having instructions encoded thereon such that when the instructions are executed, the one or more processors perform operations of:
   selecting a fusion method;
   processing an input video sequence to generate a plurality of detections for each frame in the input video sequence, wherein a detection is a representation of an object candidate within the frame of the input video sequence;
   fusing the plurality of detections to generate a set of fused detections for each frame using the selected fusion method;
   sending the set of fused detections to a classification module, a scoring module, and an accept-reject module;
   wherein the classification module:
   a) generates a classification score for each fused detection, labeling the fused detection based on a predetermined classification threshold, and passes the classification score to a learning module and the accept-reject module; or
   b) generates a token indicating that the classification module has abstained from generating a classification score and passes the token to the learning module and the accept-reject module;

wherein the scoring module produces a confidence score for each fused detection based on a set of learned parameters from the learning module and the set of fused detections;

filtering of the set of fused detections by the accept-reject module based on one of the classification score or the confidence score; and outputting a set of final detections representing an object.

2. The system as set forth in claim 1, wherein the one or more processors further perform an operation of updating the set of learned parameters with the classification score and the confidence score when the classification score is available.

3. The system as set forth in claim 2, wherein the one or more processors further perform an operation of generating, by the learning module, a set of learned fusion parameters and a set of learned scored parameters, wherein the set of learned fusion parameters are provided as input to the fusion module, and wherein the set of learned scored parameters are provided as input to the scoring module.

4. The system as set forth in claim 1, wherein if a classification score is available, then the accept-reject module automatically uses the classification score for filtering the set of fused detections and discards the confidence score, and wherein if the classification score is unavailable, then the accept-reject module uses the confidence score for filtering the set of fused detections.

5. The system as set forth in claim 1, wherein the one or more processors further perform an operation of using a priority fusion method to fuse the plurality of detections, wherein priority is defined by the L2-norm of the feature vector $a_i$, weighted by at least one input parameter as follows:

$$z = \underset{i}{\mathrm{argmax}}\, w_i + \|a_i\|, \forall\, i = 1, \ldots, k,$$

where z is the index of the detection with the highest priority, argmax denotes argument of the maximum, w denotes at least one input parameter, k represents the total number of detection sources, i represents an index of the detection source (i=1, 2, ..., k), ‖ represents norm of, and ∀ denotes "for all".

6. The system as set forth in claim 1, wherein the one or more processors further perform an operation of using a mean fusion method to fuse the plurality of detections.

7. A computer-implemented method for object detection for video sequences using classification-based learning, comprising:

an act of causing a data processor to execute instructions stored on a non-transitory memory such that upon execution, the data processor performs operations of:

selecting a fusion method;

processing an input video sequence to generate a plurality of detections for each frame in the input video sequence, wherein a detection is a representation of an object candidate within the frame of the input video sequence;

fusing the plurality of detections to generate a set of fused detections for each frame using the selected fusion method;

sending the set of fused detections to a classification module, a scoring module, and an accept-reject module;

wherein the classification module:

a) generates a classification score for each fused detection, labeling the fused detection based on a predetermined classification threshold, and passes the classification score to a learning module and the accept-reject module; or b) generates a token indicating that the classification module has abstained from generating a classification score and passes the token to the learning module and the accept-reject module;

wherein the scoring module produces a confidence score for each fused detection based on a set of learned parameters from the learning module and the set of fused detections;

filtering of the set of fused detections by the accept-reject module based on one of the classification score or the confidence score; and outputting a set of final detections representing an object.

8. The method as set forth in claim 7, wherein the data processor further performs an operation of updating the set of learned parameters with the classification score and the confidence score when the classification score is available.

9. The method as set forth in claim 8, wherein the data processor further performs an operation of generating, by the learning module, a set of learned fusion parameters and a set of learned scored parameters, wherein the set of learned fusion parameters are provided as input to the fusion module, and wherein the set of learned scored parameters are provided as input to the scoring module.

10. The method as set forth in claim 7, wherein if a classification score is available, then the accept-reject module automatically uses the classification score for filtering the set of fused detections and discards the confidence score, and wherein if the classification score is unavailable, then the accept-reject module uses the confidence score for filtering the set of fused detections.

11. The method as set forth in claim 7, wherein the data processor further performs an operation of using a priority fusion method to fuse the plurality of detections, wherein priority is defined by the L2-norm of the feature vector $a_i$, weighted by at least one input parameter as follows:

$$z = \underset{i}{\mathrm{argmax}}\, w_i + \|a_i\|, \forall\, i = 1, \ldots, k,$$

where z is the index of the detection with the highest priority, argmax denotes argument of the maximum, w denotes at least one input parameter, k represents the total number of detection sources, i represents an index of the detection source (i=1, 2, ..., k), ‖ represents norm of, and ∀ denotes "for all".

12. The method as set forth in claim 7, wherein the data processor further performs an operation of using a mean fusion method to fuse the plurality of detections.

13. A computer program product for object detection for video sequences using classification-based learning, the computer program product comprising computer-readable instructions stored on a non-transitory computer-readable medium that are executable by a computer having a processor for causing the processor to perform operations of:

selecting a fusion method;

processing an input video sequence to generate a plurality of detections for each frame in the input video sequence, wherein a detection is a representation of an object candidate within the frame of the input video sequence;

fusing the plurality of detections to generate a set of fused detections for each frame using the selected fusion method;

sending the set of fused detections to a classification module, a scoring module, and an accept-reject module;
wherein the classification module:
   a) generates a classification score for each fused detection, labeling the fused detection based on a predetermined classification threshold, and passes the classification score to a learning module and the accept-reject module; or
   b) generates a token indicating that the classification module has abstained from generating a classification score and passes the token to the learning module and the accept-reject module;
wherein the scoring module produces a confidence score for each fused detection based on a set of learned parameters from the learning module and the set of fused detections;
filtering of the set of fused detections by the accept-reject module based on one of the classification score or the confidence score; and
outputting a set of final detections representing an object.

14. The computer program product as set forth in claim 13, further comprising instructions for causing the processor to perform an operation of updating the set of learned parameters with the classification score and the confidence score when the classification score is available.

15. The computer program product as set forth in claim 14, further comprising instructions for causing the processor to perform an operation of generating, by the learning module, a set of learned fusion parameters and a set of learned scored parameters, wherein the set of learned fusion parameters are provided as input to the fusion module, and wherein the set of learned scored parameters are provided as input to the scoring module.

16. The computer program product as set forth in claim 13, wherein if a classification score is available, then the accept-reject module automatically uses the classification score for filtering the set of fused detections and discards the confidence score, and wherein if the classification score is unavailable, then the accept-reject module uses the confidence score for filtering the set of fused detections.

17. The computer program product as set forth in claim 13, further comprising instructions for causing the processor to perform an operation of using a priority fusion method to fuse the plurality of detections, wherein priority is defined by the L2-norm of the feature vector $a_i$, weighted by at least one input parameter as follows:

$$z = \underset{i}{\operatorname{argmax}} \ w_i + \|a_i\|, \ \forall \ i = 1, \ldots, k,$$

where z is the index of the detection with the highest priority, argmax denotes argument of the maximum, w denotes at least one input parameter, k represents the total number of detection sources, i represents an index of the detection source (i=1, 2, ..., k), $\|$ represents norm of, and $\forall$ denotes "for all".

18. The computer program product as set forth in claim 13, further comprising instructions for causing the processor to perform an operation of using a mean fusion method to fuse the plurality of detections.

* * * * *